US012787128B2

(12) United States Patent
Kwack et al.

(10) Patent No.: US 12,787,128 B2
(45) Date of Patent: Nov. 3, 2026

(54) COOKING APPLIANCE

(71) Applicant: LG ELECTRONICS INC., Seoul (KR)

(72) Inventors: Younghwan Kwack, Seoul (KR); Seongho Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 758 days.

(21) Appl. No.: 18/198,156

(22) Filed: May 16, 2023

(65) Prior Publication Data

US 2023/0371139 A1 Nov. 16, 2023

(30) Foreign Application Priority Data

May 16, 2022 (KR) ........................ 10-2022-0059387

(51) Int. Cl.

*H05B 6/06* (2006.01)
*H05B 1/02* (2006.01)
*H05B 6/12* (2006.01)
*H05B 6/44* (2006.01)

(52) U.S. Cl.

CPC ......... *H05B 6/1272* (2013.01); *H05B 1/0261* (2013.01); *H05B 6/065* (2013.01); *H05B 6/1245* (2013.01); *H05B 6/44* (2013.01)

(58) Field of Classification Search

CPC ...... H05B 6/44; H05B 6/1272; H05B 1/0261; H05B 6/065; H05B 6/1245
See application file for complete search history.

(56) References Cited

U.S. PATENT DOCUMENTS

2021/0195702 A1 6/2021 Kim et al.
2021/0298134 A1* 9/2021 Sasagawa ................ H05B 6/08

FOREIGN PATENT DOCUMENTS

DE 10127051 A1 * 12/2002 ........... H05B 6/1245
JP 2005-216594 A 8/2005

* cited by examiner

*Primary Examiner* — Nathaniel E Wiehe
*Assistant Examiner* — Theodore C Ribadeneyra
(74) *Attorney, Agent, or Firm* — Birch, Stewart, Kolasch & Birch, LLP

(57) ABSTRACT

A cooking appliance includes a magnetic field control module that selectively cancels a portion of a magnetic field reaching an intermediate heating element generated from a working coil. The magnetic field control module may include a canceling coil and a switch capable of closing or opening the canceling coil.

20 Claims, 6 Drawing Sheets

COOKING APPLIANCE

CROSS-REFERENCE TO RELATED APPLICATION

This non-provisional application claims the benefit under 35 U.S.C. § 119(a) to Patent Application No. 10-2022-0059387, filed in the Republic of Korea on May 16, 2022, all of which is hereby expressly incorporated by reference into the present application.

TECHNICAL FIELD

The present disclosure relates to a cooking appliance. More particularly, the present disclosure relates to adjusting the strength of a magnetic field of a cooking appliance that heats both a magnetic substance and a non-magnetic substance.

BACKGROUND ART

Various types of cooking appliance are used to heat food at home or in a restaurant. Conventionally, gas stoves using gas as fuel have been widely used, but recently devices for heating an object to be heated, for example, a cooking vessel such as pots, have been spread using electricity instead of gas.

A method of heating an object to be heated using electricity is largely divided into a resistance heating method and an induction heating method. The electric resistance method is a method of heating an object to be heated by transferring heat generated when an electric current flows through a metal resistance wire or a non-metallic heating element such as silicon carbide to the object to be heated (for example, a cooking vessel) through radiation or conduction. In addition, when high-frequency power of a predetermined size is applied to the coil, the induction heating method generates an eddy current in the object to be heated consisting of a metal component using a magnetic field generated around the coil to heat the object to be heated itself.

Recently, most of the induction heating methods are applied to cooktops.

Meanwhile, such cooking appliance has a limitation in that the heating efficiency when heating the non-magnetic vessel is very low compared to the heating efficiency when heating the magnetic vessel.

In the case of the cooking appliance to which an induction heating method is applied, in order to solve the problem of very low heating efficiency for non-magnetic substance (e.g., heat-resistant glass, pottery, etc.), the cooking appliance may include an intermediate heating element. The cooking appliance can heat the non-magnetic substance by using the intermediate heating element.

However, when the cooking appliance includes an intermediate heating element, a portion of a magnetic field generated from the working coil is coupled to the intermediate heating element while heating the magnetic substance, so the heating efficiency is lowered than when the magnetic field is directly coupled to the magnetic substance.

To solve such problems, it is possible to adjust the coupling force of the magnetic field generated from the working coil using the designing or controlling method of the working coil. However, there may be issues where the existing working coil cannot be used as is, or the introduction of a controlling method could be cumbersome.

DISCLOSURE

Technical Problem

The present disclosure provides a cooking appliance including an intermediate heating element that can minimize a problem in that the heating efficiency of a magnetic vessel decreases due to the coupling of a magnetic field to the intermediate heating element.

The present disclosure provides a cooking appliance that can maximize the heating efficiency by designing a diameter of a working coil, a diameter of a canceling coil, a diameter of an intermediate heating element, and a diameter of an opening through which the magnetic field formed in the center of the working coil.

Technical Solution

According to an embodiment of the present disclosure, a cooking appliance includes an upper plate for placing an object to be heated, an intermediate heating element installed on the upper plate, a working coil for generating a first magnetic field passing through at least one of the objects to be heated and the intermediate heating element, an inverter for controlling the current applied to the working coil and a magnetic field control module for generating a second magnetic field canceling out at least a portion of the first magnetic field.

According to an embodiment of the present disclosure, a magnetic field control module selectively generates at least one closed loop between an intermediate heating element and a working coil.

According to an embodiment of the present disclosure, a magnetic field control module forms at least one closed loop between an intermediate heating element and a working coil when an object to be heated is a magnetic substance, and not form the closed loop between the intermediate heating element and the working coil when the object to be heated is a non-magnetic substance.

According to an embodiment of the present disclosure, a magnetic field control module includes a canceling coil selectively generating at least one closed loop based on a type of an object to be heated.

According to an embodiment of the present disclosure, a shape of a canceling coil has a disconnecting portion to selectively generate at least one the closed loop.

According to an embodiment of the present disclosure, a magnetic field control module includes a switch to selectively connect a disconnecting portion of a canceling coil.

According to an embodiment of the present disclosure, a canceling coil is disposed between an intermediate heating element and a working coil.

According to an embodiment of the present disclosure, a switch is turned on when an object to be heated is a magnetic substance and the switch is turned off when the object to be heated is a non-magnetic substance.

According to an embodiment of the present disclosure, a diameter of a working coil is a first length, a diameter of an intermediate heating element is a second length greater than the first length, an opening through which at least a portion of the first magnetic field passes formed at the center of the intermediate heating element, a diameter of the opening is a third length less than the first length, and a diameter of a canceling coil is a fourth length greater than the first length and less than the fourth length.

According to an embodiment of the present disclosure, a diameter of a working coil is a first length, a diameter of an intermediate heating element is a fifth length less than the first length, and a canceling coil is a sixth length less than the fifth length.

Advantageous Effects

According to the present disclosure, the magnetic field concentration region can be adjusted to an object to be heated or an intermediate heating element by generating a magnetic field canceling at least a portion of a magnetic field generated by a working coil, thereby having an effect of improving the heating efficiency based on the material of the vessel.

According to the present disclosure, since a magnetic field control module further includes a switch, it is possible to selectively generate a magnetic field that cancels out a magnetic field generated by a working coil according to the type of an object to be heated, thereby having an advantage of adjusting the magnetic field concentration region based on the material of the vessel.

According to the present disclosure, it is possible to adjust the magnetic field concentration region by disposing a canceling coil, which is capable of forming at least one closed loop, between a working coil and an intermediate heating element to cancel a magnetic field reaching the intermediate heating element among a magnetic field generated from the working coil when heating the magnetic substance, thereby having an effect of improving the heating efficiency when heating magnetic substance.

According to the present disclosure, it is possible to maximize the heating efficiency when heating magnetic and non-magnetic substances by adjusting a diameter of a canceling coil based on a diameter of a working coil, a diameter of an intermediate heating element, and whether an opening through which at least a portion of the magnetic field passes is formed at the center of the intermediate heating element, and a diameter of the opening.

BEST MODE

Figure 1:
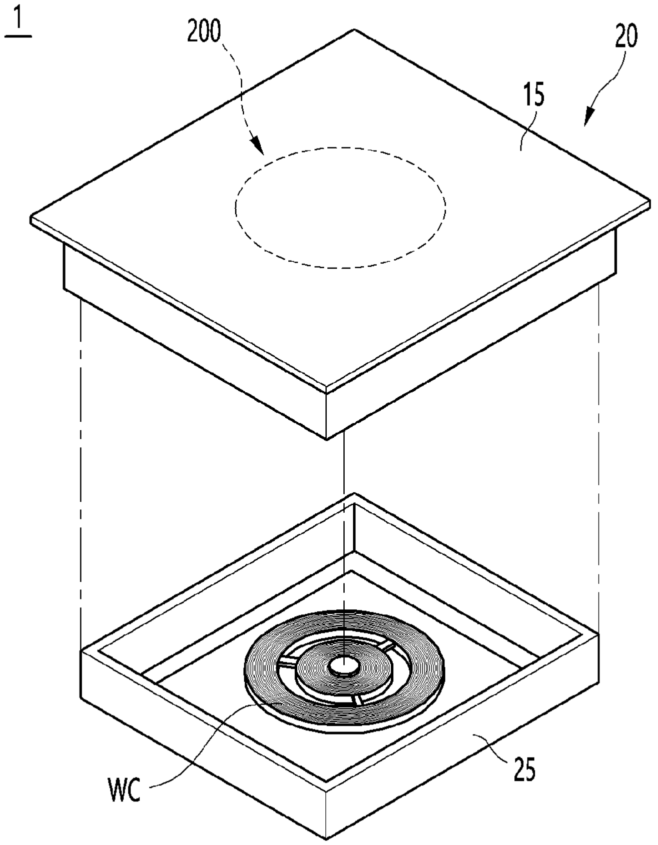
FIG. 1 is a perspective view illustrating a cooking appliance according to an embodiment of the present disclosure.

Hereinafter, embodiments relating to the present disclosure will be described in detail with reference to the drawings. The suffixes "module" and "unit" for components used in the description below are assigned or mixed in consideration of easiness in writing the specification and do not have distinctive meanings or roles by themselves.

Hereinafter, preferred embodiments according to the present disclosure will be described in detail with reference to the accompanying drawings. In the drawings, the same reference numerals are used to refer to the same or similar components.

Hereinafter, a cooking appliance and an operating method thereof according to an embodiment of the present disclosure will be described. Hereinafter, the cooking appliance may be an induction heating type cooktop.

FIG. 1 is a perspective view illustrating a cooking appliance according to an embodiment of the present disclosure.

Referring to FIG. 1, a cooking appliance 1 may include a case 25, a cover 20, a working coil WC and an intermediate heating element 200.

The case 25 may form the outer appearance of the cooking appliance 1. The case 25 may protect components provided inside the cooking appliance 1 from the outside.

Inside the case 25, the working coil WC, an inverter 140 (see FIG. 2) controlling the current flowing through the working coil WC, and a resonant capacitor (not shown) resonating with the working coil of the working coil WC, a switch (not shown), and the like may be provided. That is, the case 25 may be provided with other components related to driving the working coil WC, which is various devices.

The cover 20 may be combined to an upper side of the case 25 to form the outer appearance of the cooking appliance 1 together with the case 25.

An upper plate 15 on which an object to be heated 100 such as a cooking vessel is placed may be formed on the cover 20. The object to be heated 100 may be disposed on the upper plate 15.

The upper plate 15 may be made of, for example, a glass material (e.g., ceramic glass). However, since this is only an example, it is reasonable not to be limited thereto, and the material of the upper plate 15 may be various.

In addition, the upper plate 15 may be provided with an input interface (not shown) that receives an input from a user to transmit the input to a control module (not shown) for an input interface. Of course, the input interface may be provided at a position other than the upper plate 15.

For reference, the input interface may be a module for inputting a desired heating intensity or driving time of the induction heating type cooktop 1 and may be variously implemented with a physical button or a touch panel. Also, the input interface may include, for example, a power button, a lock button, a power level adjustment button (+, −), a timer adjustment button (+, −), a charging mode button, and the like. In addition, the input interface may transmit the input received from the user to the control module for the input interface (not shown), and the control module for the input interface may transmit the input to the aforementioned control module (i.e., the control module for the inverter). In addition, the aforementioned control module may control the operations of various devices (e.g., the working coils) based on the input (i.e., a user input) provided from the control module for the input interface.

Whether the working coil is driven and the heating intensity (ie, heating power) may be visually displayed on the upper plate part 15. It may be displayed by an indicator (not shown) composed of a plurality of light emitting devices (eg, LEDs) provided in the case 25.

The working coil WC may be installed inside the case 25 to heat the object to be heated.

Specifically, the working coil WC may be driven by the aforementioned control module (not shown), and when the object to be heated is disposed on the upper plate 15, the working coil WC may be driven by the control module.

In addition, the working coil WC may directly heat an object to be heated (i.e., a magnetic substance) having magnetism and may indirectly heat an object to be used (i.e., a nonmagnetic substance) through an intermediate heating element 200. In addition, the working coil WC may heat the object to be heated in an induction heating manner and may be provided to overlap the intermediate heating element 200 in a longitudinal direction (i.e., a vertical direction or an upward and downward direction).

That is, when the inverter 140 controls the current to flow through the working coil WC, the working coil WC may generate a magnetic field for heating the object to be heated 100 or the intermediate heating element 200. The magnetic field generated from the working coil WC is can either couple with the intermediate heating element 200 and indirectly heat the object to be heated 100 by the heat generated from the intermediate heating element 200, or couple with the magnetic object to be heated 100 and directly heat the object to be heated 100.

For reference, although the structure in which one working coil WC is installed in the case 25 is illustrated in FIG. 1, the embodiment is not limited thereto. That is, one or more working coils WC may be installed in the case 25. The intermediate heating element 200 may be installed to correspond to the working coil WC. The number of intermediate heating elements 200 and the number of working coils WC may be the same.

In addition, the intermediate heating element 200 may be installed on the upper plate 15. The intermediate heating element 200 may be coated on the upper plate 15 to heat non-magnetic substance among the objects to be heated 100. The intermediate heating element 200 may be induction heated by the working coil WC.

The intermediate heating element 200 may be disposed on the upper or lower surface of the upper plate 15. For example, as indicated by a dotted line in FIG. 1, the intermediate heating element 200 may be installed on the lower surface of the upper plate 15. On the other hand, this is merely exemplary. That is, the intermediate heating element 200 may be installed on either the upper surface or the inside of the upper plate 15 as well as the lower surface.

Also, the intermediate heating element 200 may have at least one of magnetic and nonmagnetic properties (i.e., a magnetic property, a nonmagnetic property, or both the magnetic and nonmagnetic properties).

In addition, the intermediate heating element 200 may be made of, for example, a conductive material (e.g., aluminum), and as illustrated in the drawings, a plurality of rings having different diameters may be installed on the upper plate 15 in a repeated shape, but is not limited thereto. That is, the intermediate heating element 200 may be made of a material other than a conductive material. Also, the intermediate heating element 200 may be provided in a shape other than the shape in which the plurality of rings having different diameters are repeated.

In addition, one or a plurality of intermediate heating elements 200 may be installed.

Figure 2:
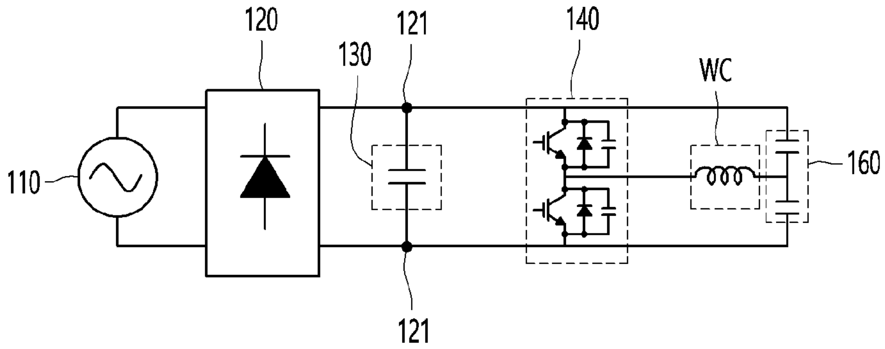
FIG. 2 is a circuit diagram of a cooking appliance according to an embodiment of the present disclosure.

FIG. 2 is a circuit diagram of a cooking appliance according to an embodiment of the present disclosure.

Referring to FIG. 2, the cooking appliance 1 may include at least one of a power supply 110, a rectifier 120, a DC link capacitor 130, an inverter 140, a working coil WC, and a resonance capacitor 160.

The power supply 110 may receive external power. Power received from the outside to the power supply 110 may be alternation current (AC) power.

The power supply 110 may supply an AC voltage to the rectifier 120.

The rectifier 120 is an electrical device for converting alternating current into direct current. The rectifier 120 converts the AC voltage supplied through the power supply 110 into a DC voltage. The rectifier 120 may supply the converted voltage to both DC ends 121.

An output terminal of the rectifier 120 may be connected to both DC ends 121. Both DC ends 121 of the DC output through the rectifier 120 may be referred to as a DC link. A voltage measured at both DC ends 121 is referred to as a DC link voltage.

The DC link capacitor 130 serve as a buffer between the power supply 110 and the inverter 140. For example, the DC link capacitor 130 may be used to maintain the DC link voltage converted through the rectifier 120 and supply the DC link voltage up to the inverter 140.

The inverter 140 serves as a switch for switching the voltage applied to the working coil WC so that high-frequency current flows through the working coil WC.

The inverter 140 may apply current to the working coil WC. The inverter 140 may include a relay or a semiconductor switch that turns on or off the working coil WC.

For example, the inverter 140 may include a semiconductor switch, and the semiconductor switch may be an insulated gate bipolar transistor (IGBT) or a wide band gab (WBG) device. Since this is merely an example, the embodiment is not limited thereto. The WBG device may be silicon carbide (SiC) or gallium nitride (GaN). The inverter 140 drives the semiconductor switch to allow the high-frequency current to flow in the working coil 150, and thus, high-frequency magnetic fields are generated in the working coil 150.

The working coil WC may include at least one working coil WC generating a magnetic field for heating the object to be heated 100.

depending on whether the switching device is driven. When the current flows through the working coil WC, the magnetic fields may be generated. The working coil WC may generate the magnetic fields based on the flow of the current to heat the cooking appliance.

The working coil WC has one side connected to a connection point of the switching device of the inverter 140 and the other side connected to the resonance capacitor 160.

The driving of the switching device may be performed by a driving unit. A high-frequency voltage may be applied to the working coil WC while the switching devices alternately operate under the control of a switching time outputted from the driving unit. Also, since the turn on/off time of the switching device, which is applied from the driving unit, is controlled to be gradually compensated, the voltage supplied to the working coil WC may be converted from a low voltage into a high voltage.

The resonance capacitor 160 may resonant with the working coil of the working coil WC.

The resonance capacitor 160 may be a component to serve as a buffer. The resonance capacitor 160 controls a saturation voltage increasing rate during the turn-off of the switching device to affect an energy loss during the turn-off time.

Meanwhile, as shown in FIG. 1, in the cooking appliance 1 including the intermediate heating body 200, when heating the object to be heated 100, which is a magnetic material, a portion of the magnetic field generated from the working coil WC is coupled to the intermediate heating body 200 and heat the object to be heated 100 indirectly. Therefore, there is a problem that the heat efficiency is lowered than in the case of directly heating the object to be heated 100 by the magnetic field is coupled to the object to be heated 100.

Accordingly, the cooking appliance 1 according to an embodiment of the present disclosure provides selectively generating a second magnetic field that cancels out at least a portion of a magnetic field generated from the working coil WC depending on whether the type of object to be heated is magnetic or non-magnetic. To this end, the cooking appliance 1 may further include a magnetic field control module generating the second magnetic field, which will be described in detail below.

Figure 3:
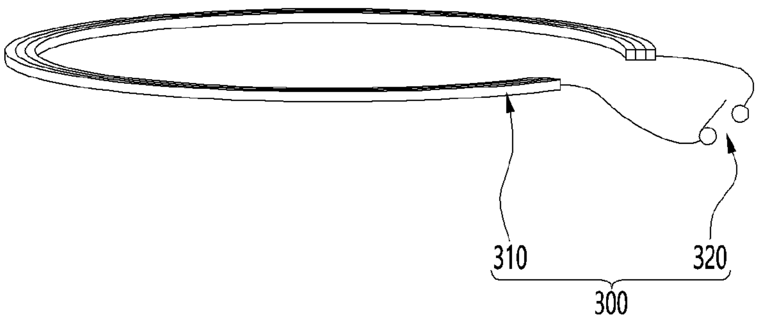
FIG. 3 is a diagram showing the shape of a magnetic field control module according to an embodiment of the present disclosure.

FIG. 3 is a diagram showing the shape of a magnetic field control module according to an embodiment of the present disclosure.

The cooking appliance 1 according to the present disclosure may include a magnetic field control module 300 that generates a magnetic field canceling at least a portion of a magnetic field generated by the working coil WC. A brief description of the principle of the magnetic field control module 300 canceling the magnetic field in the present disclosure is as follows. For example, when a current flows through a first coil, a magnetic field is generated in the first coil. The direction of the four fingers of the right hand is the direction of the current, and the direction of the thumb is the direction of the magnetic field. At this time, if there is a second coil that at least partially overlaps the first coil in the vertical direction, a current in the opposite direction to the current flowing in the first coil is induced in the second coil. As a result, a magnetic field in the opposite direction to the magnetic field generated from the first coil can be generated, thereby canceling out at least a portion of the magnetic field generated from the first coil.

The magnetic field control module 300 may include a canceling coil 310 selectively forming at least one closed loop based on the type of the object to be heated 100. The canceling coil 310 may have a shape in which at least a portion is disconnected to selectively form the closed loop. The canceling coil 310 may have a shape that includes the closed loop with at least some portions disconnected. In the example of FIG. 3, the canceling coil 310 is shown in a ring shape in which at least a portion is disconnected, but since this is merely an example, it is reasonable not to be limited thereto. For example, the canceling coil 310 may be formed in various shapes having a closed loop, such as a quadrangular shape or a hexagonal shape in which at least a portion is disconnected.

The magnetic field control module 300 may further include a switch 320 connecting the disconnected portion of the canceling coil 310. The switch 320 may connect opposite ends of the canceling coil 310. For example, the switch 320 may be connected to opposite ends of the canceling coil 310 through wires or the like. The switch 320 may be closed or opened, and when closed, the disconnected portion of the canceling coil 310 may be connected.

As described above, the magnetic field control module 320 includes the canceling coil 310 and the switch 320, thereby selectively generating a second magnetic field B2 (see FIGS. 5 and 7) canceling at least a portion of a first magnetic field B1 (see FIGS. 4 to 7) generated from the working coil WC. In other words, when the switch 320 is turned on, the current flowing through the canceling coil 310 and the switch 320 forms a closed loop, thereby generating a second magnetic field (B2, see FIGS. 5 and 7). In this case, the area of the formed closed loop may be a first area. Meanwhile, when the switch 320 is turned off, a closed loop may not be formed in the canceling coil 310 or a closed loop having a second area narrower than the first area may be formed. Therefore, the second magnetic field B2 (see FIGS. 5 and 7) may be generated selectively by turning the switch 320 based on the type of the object to be heated 100.

Therefore, in the cooking appliance 1 according to the present disclosure, when the inverter 140 controls the current to flow through the working coil WC, the first magnetic field B1 (see FIGS. 4 to 7) may be generated by the current flowing through the working coil WC. At this time, a current in the opposite direction to the current flowing in the canceling coil 310 overlapping at least a portion in the vertical direction with the working coil WC is induced in the canceling coil 310. Accordingly, the canceling coil 310 may generate the second magnetic field B2 (see FIGS. 5 and 7) opposite to the first magnetic field B1 (see FIGS. 4 to 7) generated from the working coil WC. As a result, the cooking appliance 1 according to the present disclosure may improve the heating efficiency when heating the magnetic substance by generating the second magnetic field B2 (see FIGS. 5 and 7) canceling at least a portion of the first magnetic field B1 (see FIGS. 4 to 7). In this regard, it will be described in detail in FIGS. 4 to 7.

Next, a shape and an operation method of the cooking appliance 1 according to a first and a second embodiments of the present disclosure will be described with reference to FIGS. 4 to 7.

When the object to be heated 100 is a magnetic substance, the first magnetic field B1 generated from the working coil WC couple to the object to be heated 100 and directly heats the object to be heated 100, or couple to the intermediate heating element 200 and indirectly heats the object to be heated 100 by heating the intermediate heating element 200. However, when heating the magnetic substance, when the object to be heated 100 is indirectly heated by the heat of the intermediate heating element 200, there is a problem that the heating efficiency is lower than when the object to be heated 100 is directly heated.

Therefore, by disposing the canceling coil 310 between the intermediate heating element 200 and the working coil WC, it is possible to improve the heating efficiency by selectively generating a second magnetic field B2 that cancels out at least a portion of the magnetic field that reaches the intermediate heating element 200 from the first magnetic field B1, depending on the type of the object to be heated 100.

Figure 4:
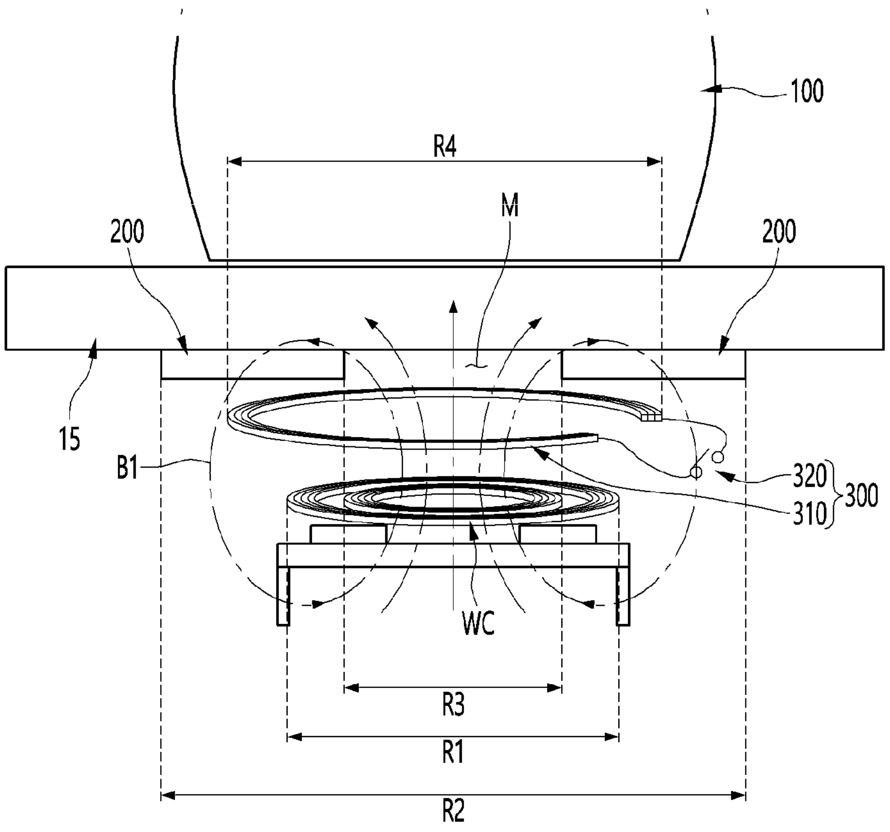
FIG. 4 is a diagram illustrating a cooking appliance according to a first embodiment of the present disclosure.
Figure 5:
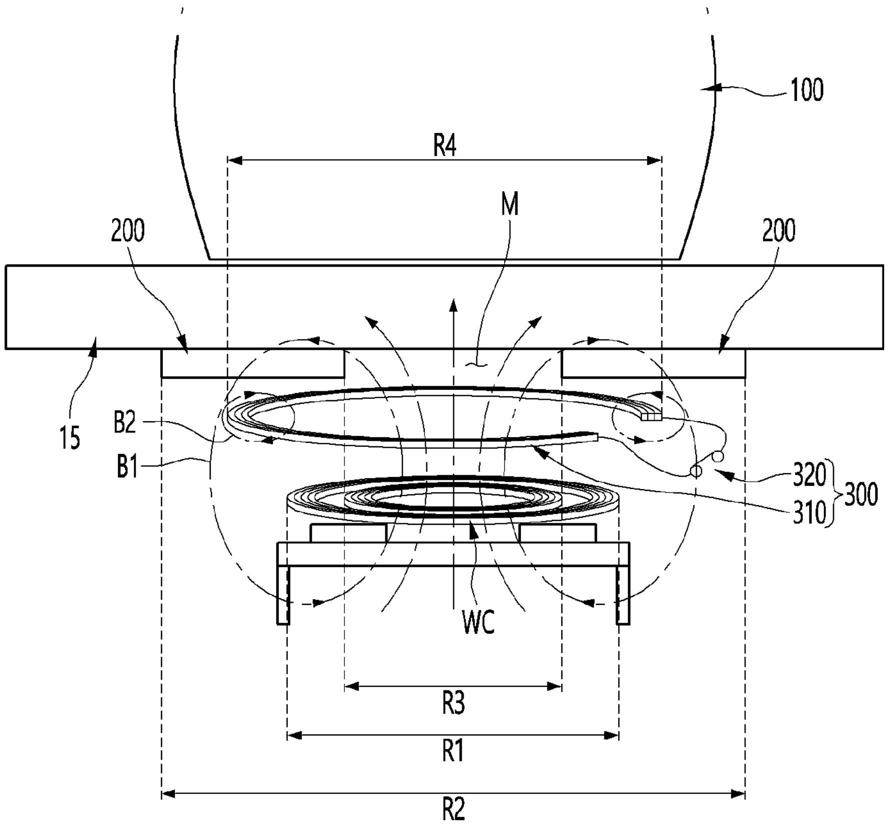
FIG. 5 is a diagram illustrating a cooking appliance according to a first embodiment of the present disclosure.

FIGS. 4 and 5 are diagrams illustrating a cooking appliance according to a first embodiment of the present disclosure. Specifically, FIG. 4 is a diagram illustrating the magnetic field when the cooking appliance 1 according to the first embodiment of the present disclosure heats the object to be heated 100 which is a non-magnetic substance, and FIG. 5 is a diagram illustrating the magnetic field when the cooking appliance 1 according to the first embodiment of the present disclosure heats the object to be heated 100 which is a magnetic substance.

In the cooking appliance 1 according to the first embodiment, an opening M through which at least a portion of the first magnetic field B1 generated from the working coil WC passes may be formed at the center of the intermediate heating element 200. Therefore, the first magnetic field B1 generated from the working coil WC can indirectly heat the object to be heated 100 by reaching the intermediate heating element 200 and heating the intermediate heating element 200, or the working coil WC can directly heat the object to be heated 100 by passing through the opening M and reaching the object to be heated 100.

A diameter of the working coil WC may have a first length R1, a diameter of the intermediate heating element 200 may have a second length R2 greater than the first length R1, the opening M may have a third length R3 less than the first length R1, and a diameter of the canceling coil 310 may have a fourth length R4 greater than the first length R1 and less than the second length R2. The heating efficiency can be improved according to the diameter design, which will be described in detail in FIGS. 4 and 5, respectively. In addition, the relationship between the diameters of the working coil WC, the intermediate heating element 200 and the canceling coil 310 is an example for maximizing the heating efficiency of the object to be heated 100 according to the first embodiment of the present disclosure. As such, even if the magnitude relationship of each length is different in the range in which the second magnetic field B2 (see FIGS. 5 and 7) can cancel at least a portion of the first magnetic field B1 (see FIGS. 4 to 7), it does not deviate from the scope of the present invention. For example, the first length R1 and the second length R2 may have the same length or different lengths. Also, for example, the fourth length R4 and the first length R1 may have the same length or different lengths. And, for example, the fourth length R4 and the third length R3 may have the same length or different lengths.

That is, the cooking appliance 1 according to the present disclosure can improve the heating efficiency when heating the magnetic substance or non-magnetic substance by including the magnetic field control module 300 and by designing the diameter of the working coil WC, the intermediate heating element 200, and the opening M formed in the intermediate heating element 200 as described above. It will be described in detail with reference to FIGS. 4 and 5.

Referring to FIG. 4, when the object to be heated 100 is a non-magnetic substance, the object to be heated 100 is indirectly heated through the intermediate heating object 200 because the object to be heated 100 is not coupled to a magnetic field. Specifically, when the object to be heated 100 is a non-magnetic substance, the cooking appliance 1 heats the object to be heated 100 indirectly by heating the intermediate heating element 200 and the heat from the intermediate heats the object to be heated 100. Therefore, the cooking appliance 1 may not reduce the heating efficiency by not generating the second magnetic field B2 (see FIG. 5) that cancels out a portion of the first magnetic field B1 reaching the intermediate heating body 200. Therefore, when the object to be heated 100 is a non-magnetic substance, the switch 320 capable of connecting opposite ends of the canceling coil 320 may be turned off. Since the disconnected portion of the canceling coil 310 is not connected when the switch 320 is turned off, a closed loop is not formed in the canceling coil 310 or a closed loop having a much smaller area than when the switch 310 is turned on is formed. That is, the second magnetic field B2 (see FIG. 5) that cancels out at least a portion of the first magnetic field B1 may not be generated.

In addition, by designing the first length R1 less than the second length R2 and greater than the third length R3, the working coil WC may be placed to overlap the intermediate heating element 200 in the vertical direction between the outer circumference of the intermediate heating element 200 and the outer circumference of the opening M. That is, the entire working coil WC may be placed to overlap with the intermediate heating element 200 in a vertical direction between an outer diameter and an inner diameter of the intermediate heating element 200. Therefore, the first magnetic field B1 may be coupled to a larger area of the intermediate heating element 200 than when a part of the working coil WC is placed so as not to overlap with the intermediate heating element 200. Accordingly, the heating efficiency may be improved during heating of the non-magnetic substance due to the increase of the amount of heat generated by the intermediate heating element 200 that indirectly heats the object to be heated 100.

Meanwhile, referring to FIG. 5, when the object to be heated 100 is a magnetic substance, the heating efficiency is higher when the first magnetic field B1 is coupled to the object to be heated 100 to heat the object to be heated 100 directly than the first magnetic field B1 is coupled to the intermediate heating element 200 to heat the object to be heated 100 indirectly by the heat generated from the intermediate heating element 200. This is because the first magnetic field B1 can be coupled to the object 100 to be heated, Therefore, the heating efficiency may be improved by generating the second magnetic field B2 that cancels out at least a portion of the first magnetic field B1 reaching the intermediate heating element 200. That is, when the object to be heated 100 is a magnetic substance, the switch 320 capable of connecting opposite ends of the canceling coil 320 to generate the second magnetic field B2 may be turned on. Since the disconnected portion of the canceling coil 310 is connected when the switch 320 is turned on, a closed loop is formed to generate the second magnetic field B2 that cancels out a portion of the first magnetic field B1.

In addition, by designing the fourth length R4 to be greater than the first length R1, the entire canceling coil 310 can be placed outside the outer diameter of the working coil WC without overlapping with the working coil WC in a vertical direction. Accordingly, the second magnetic field B2 may cancel the magnetic field outside the outer diameter of the working coil WC among the first magnetic field B1.

Also, since the first length R1 is greater than the third length R3, the fourth length R4 is also greater than the third length R3. Therefore, by designing the fourth length R4 to be greater than the first length R1, the second magnetic field B2 may not cancel the magnetic field which passes through the opening M and reaches the object to be heated 100 among the first magnetic field B1.

Figure 6:
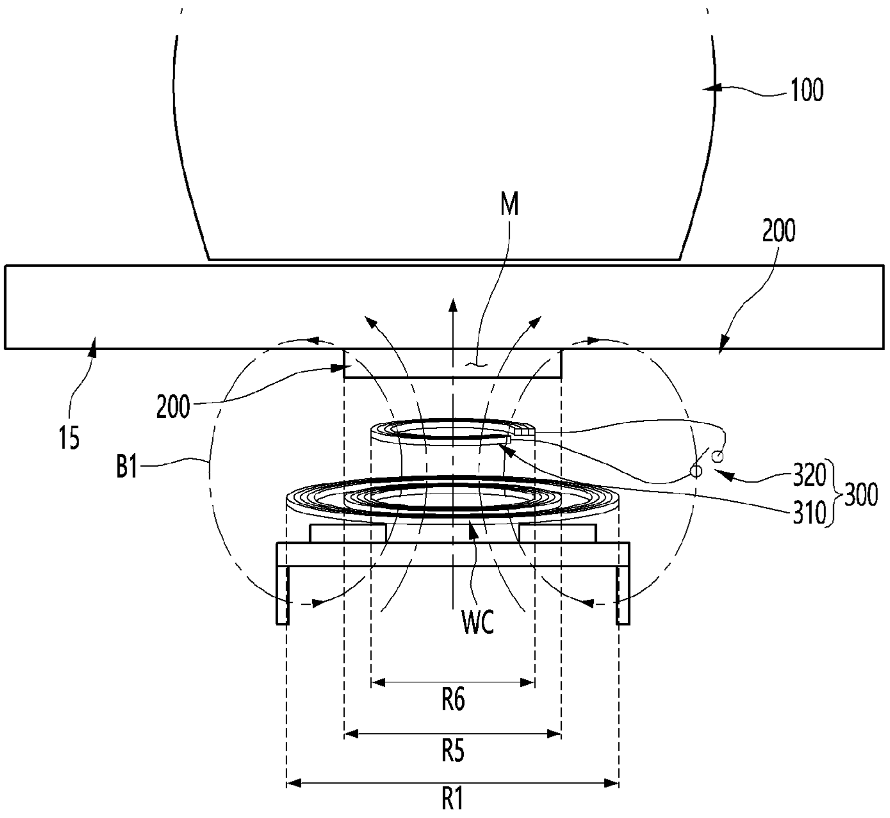
FIG. 6 is a diagram illustrating a cooking appliance according to a second embodiment of the present disclosure.
Figure 7:
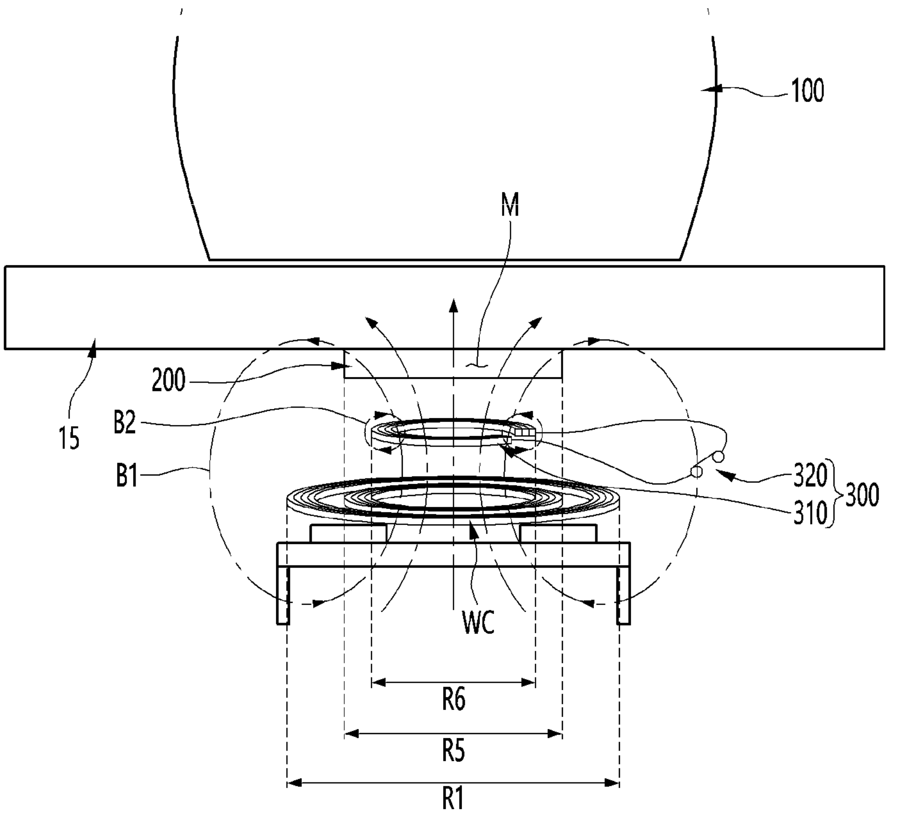
FIG. 7 is a diagram illustrating a cooking appliance according to a second embodiment of the present disclosure.

As a result, by designing the fourth length R4 to be greater than the first length R1 and less than the second length R2, the second magnetic field B2 cancels out the magnetic field reaching the intermediate element 200 among the first magnetic field B1 as much as possible. At the same time, the second magnetic field B2 may not cancel the magnetic field reaching the object to be heated 100 by passing through the opening M formed at the center of the intermediate heating element 200 as much as possible. [95] FIGS. 6 and 7 are diagrams illustrating a cooking appliance according to a second embodiment of the present disclosure. Specifically, FIG. 6 is a diagram showing the magnetic field when the cooking appliance 1 according to the second embodiment of the present disclosure heats the object to be heated 100 which is a non-magnetic substance, and FIG. 7 is a diagram illustrating the magnetic field when the cooking appliance 1 according to the second embodiment of the present disclosure heats the object to be heated 100 which is a magnetic substance.

The cooking appliance according to the second embodiment may have a shape in which the opening M through which at least a portion of the first magnetic field B1 generated from the working coil WC passes is not formed at the center of the intermediate heating element 200. Therefore, the first magnetic field B1 generated from the working coil WC reaches the intermediate heating element 200 and heats the intermediate heating element 200, and then indirectly heats the object to be heated 100. Alternatively, the first magnetic field B1 reaches the object to be heated 100 by passing through the periphery of the intermediate heating element 200, and then directly heat the object to be heated 100.

A diameter of the working coil WC may have the first length R1, a diameter of the intermediate heating element 200 may have a fifth length R5 less than the first length R1 and the canceling coil 310 may have a sixth length R6 less than the fifth length R5. The heating efficiency can be improved according to the diameter design, which will be described in detail in FIGS. 6 and 7, respectively. In addition, the above relationship between the diameters of the working coil WC, the intermediate heating element 200, the opening M formed at the center of the intermediate heating element 200 and the canceling coil 310 is an example for maximizing the heating efficiency of the object to be heated 100 according to the second embodiment of the present disclosure. As such, even if the magnitude relationship of each length is different in the range in which the second magnetic field B2 (see FIGS. 5 and 7) can cancel at least some or all of the first magnetic field B1 (see FIGS. 4 to 7), it does not deviate from the scope of the present invention. For example, the first length R1 and the fifth length R5 may have the same length or different lengths. Also, for example, the sixth length R6 and the fifth length R5 may have the same length or different lengths.

That is, the cooking appliance 1 according to the present disclosure can improve the heating efficiency when heating the magnetic substance or non-magnetic substance by including the magnetic field control module 300 and by designing the diameter of the working coil WC, the intermediate heating element 200, and the canceling coil 310 as described above. It will be described in detail with reference to FIGS. 6 and 7.

Referring to FIG. 6, when the object to be heated 100 is a non-magnetic substance, the object to be heated 100 is indirectly heated through the intermediate heating object 200 because the object to be heated 100 is not coupled to a magnetic field. Specifically, when the object to be heated 100 is a non-magnetic substance, the cooking appliance 1 heats the object to be heated 100 indirectly by heating the intermediate heating element 200 and the heat from the intermediate heats the object to be heated 100. Therefore, the cooking appliance 1 may not reduce the heating efficiency by not generating the second magnetic field B2 (see FIG. 7) that cancels out a portion of the first magnetic field B1 reaching the intermediate heating body 200. Therefore, when the object to be heated 100 is a non-magnetic substance, the switch 320 capable of connecting opposite ends of the canceling coil 320 may be turned off. Since the disconnected portion of the canceling coil 310 is not connected when the switch 320 is turned off, a closed loop is not formed in the canceling coil 310 or a closed loop having a much smaller area than when the switch 310 is turned on is formed. That is, the second magnetic field B2 (see FIG. 7) that cancels out at least a portion of the first magnetic field B1 may not be generated.

In addition, by designing the first length R1 to be greater than the fifth length R5, the diameter of the working coil WC can be greater than the diameter of the intermediate heating element 200, the entire intermediate heating element 200 may be placed to overlap with the working coil WC in the vertical direction. Accordingly, the first magnetic field B1 can be coupled to almost the entire area of the intermediate heating element 200. Accordingly, the heating efficiency may be improved during heating of the non-magnetic substance due to the increase of the amount of heat generated by the intermediate heating element 200 that indirectly heats the object to be heated 100.

Meanwhile, referring to FIG. 7, when the object to be heated 100 is a magnetic substance, the heating efficiency is higher when the first magnetic field B1 is coupled to the object to be heated 100 to heat the object to be heated 100 directly than the first magnetic field B1 is coupled to the intermediate heating element 200 to heat the object to be heated 100 indirectly by the heat generated from the intermediate heating element 200. This is because the first magnetic field B1 can be coupled to the object 100 to be heated, Therefore, the heating efficiency may be improved by generating the second magnetic field B2 that cancels out at least a portion of the first magnetic field B1 reaching the intermediate heating element 200. That is, when the object to be heated 100 is a magnetic substance, the switch 320 capable of connecting opposite ends of the canceling coil 320 to generate the second magnetic field B2 may be turned on. Since the disconnected portion of the canceling coil 310 is connected when the switch 320 is turned on, a closed loop is formed to generate the second magnetic field B2 that cancels out a portion of the first magnetic field B1.

In addition, since the diameter of the canceling coil 310 is less than the diameter of the intermediate heating element 200 by designing the sixth length R6 to be less than the fifth length R5, the entire canceling coil 310 may be placed to overlap the intermediate heating element 200 in the vertical direction. Therefore, the second magnetic field B2 cancels out the magnetic field reaching the intermediate heating element 200 as much as possible among the first magnetic field B1. At the same time, the second magnetic field B2 does not cancel the magnetic field reaching the object to be heated 100 by passing through the periphery of the intermediate heating element 200 as much as possible. Thus, the heating efficiency can be maximized when heating the non-magnetic material.

The magnetic field control module 300 of the cooking appliance 1 according to various embodiments of the present disclosure described above may operate based on the type of the object to be heated 100. Next, a method of operating the cooking appliance 1 according to various embodiments of the present disclosure will be described with reference to FIGS. 8 and 9.

Figure 8:
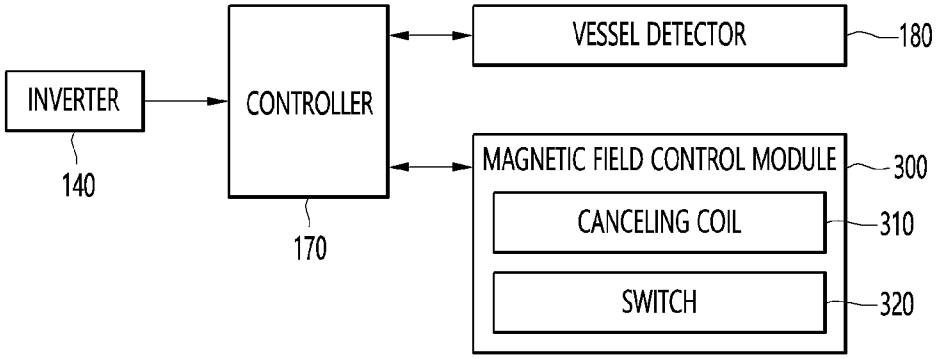
FIG. 8 is a control block diagram of a cooking appliance according to various embodiments of the present disclosure.

FIG. 8 is a control block diagram of a cooking appliance according to various embodiments of the present disclosure.

According to various embodiments of the present disclosure, the cooking appliance 1 may include at least one of an inverter 140, a controller 170, a vessel detector 180, and a magnetic field control module 300. FIG. 8 shows only some components for explaining the present disclosure, and the cooking appliance 1 may further include components other than the components shown in FIG. 8.

The inverter 140 may be driven so that the current is supplied to the working coil WC.

The controller 170 may control the operation of the cooking appliance 1. The controller 170 may control each of the switches 320 included in the inverter 140, the vessel detector 180 and the magnetic field control module 300.

The vessel detector 180 may detect the object to be heated 100. The vessel detector 180 may detect the type of the object to be heated 100. The vessel detector 180 may include at least one sensor (not shown) for detecting the type of the vessel.

According to an embodiment, the vessel detector 180 may detect the type of the object to be heated 100 by receiving a user input for selecting the type of the object to be heated 100. In this case, the vessel detector 180 may include an input interface (not shown) for receiving a user input.

According to another embodiment, the vessel detector 180 may detect the type of the object to be heated 100 according to a pre-stored vessel detection algorithm. For example, the vessel detector 180 may detect the type of the object to be heated 100 based on at least one data such as the size of the current flowing through the working coil WC or the size of the output for a predetermined time after starting the heating mode. That is, the vessel detector 180 detects the object to be heated 100 in various ways, and the present disclosure is not limited thereto. The magnetic field control module 300 may include the canceling coil 310 or the switch 320 as described in FIG. 3. The switch 320 may operate based on the type of the object to be heated 100. That is, the switch 320 may be turned on or off based on the type of the object to be heated 100. Also, when the switch 320 is turned on or off, a closed loop may be formed in the canceling coil 310 or the area of the closed loop may be changed.

Next, with reference to FIG. 9, an operation method in the case where the cooking appliance 1 is designed to include the intermediate heating element 200 and the magnetic field control module 300 as described in FIGS. 4 to 7 will be described.

Figure 9:
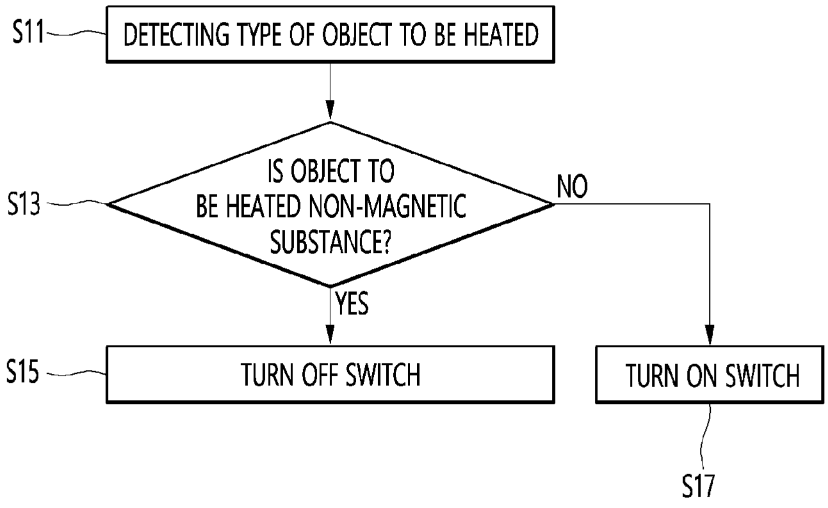
FIG. 9 is a flowchart illustrating an operating method of a cooking appliance having an intermediate heating element and a magnetic field control module according to various embodiments of the present disclosure.

FIG. 9 is a flowchart illustrating an operating method of a cooking appliance having the intermediate heating element and the magnetic field control module according to various embodiments of the present disclosure. The magnetic field control module 300 may include the canceling coil 310 and may further include a switch 320.

The controller 170 may detect the type of the object to be heated 100 at step S11.

That is, the controller 170 can detect whether the object to be heated 100 is a magnetic substance or non-magnetic substance.

The controller 170 may determine whether the object to be heated 100 is a non-magnetic substance at step S13.

The controller 170 may control the switch 320 to be turned off if the object to be heated 100 is a non-magnetic substance at step S15, and the controller 170 may control the switch 320 to be turned on if the object to be heated 100 is a magnetic substance at step S17.

That is, the switch 320 may be turned off when the object to be heated 100 is a non-magnetic and turned on when the object to be heated 100 is a magnetic material. As described in FIGS. 3 to 7, when the switch 320 capable of connecting opposite ends of the canceling coil 310 is turned on, the disconnected part of the canceling coil 310 can be connected, forming a closed loop with a first area in the canceling coil 310. Conversely, when the switch 320 is turned off, the disconnected portion of the canceling coil 310 is not connected so that no closed loop is formed in the canceling coil 310 or a closed loop with a second area smaller than the first area may be formed. That is, the switch 320 operates so that the closed loop formed in the offset coil 310 is larger when the object to be heated 100 is a magnetic substance than when the object to be heated 100 is a non-magnetic substance. Therefore, when the object to be heated 100 is a magnetic substance, the switch 320 can improve the coupling force between the first magnetic field B1 and the object to be heated 100 by generating the second magnetic field B2 that cancels out a magnetic field coupled to the intermediate heating element 200 among the first magnetic field B1. Therefore, when the object to be heated 100 is a magnetic substance, the ratio of the first magnetic field B1 reaching the intermediate heating element 200 and indirectly heating the object to be heated 100 by the heat from the intermediate heating element 200 may be decreased compared to when the object to be heated 100 is a non-magnetic substance. At the same time, the ratio of the first magnetic field B1 reaching the object to be heated 100 and directly heating the object to be heated 100 may be increased compared to when the object to be heated 100 is a non-magnetic substance. Therefore, the heating efficiency can be improved.

The above description is merely illustrative of the technical spirit of the present disclosure, and various modifications and variations will be possible without departing from the essential characteristics of the present disclosure by those of ordinary skill in the art to which the present disclosure pertains.

Accordingly, the embodiments disclosed in the present disclosure are for explanation rather than limiting the technical spirit of the present disclosure, and the scope of the technical spirit of the present disclosure is not limited by these embodiments.

The protection scope of the present disclosure should be interpreted by the following claims, and all technical ideas within the scope equivalent thereto should be construed as being included in the scope of the present disclosure.

What is claimed is:

1. A cooking appliance comprising:
- an upper plate configured to support an object to be heated;
- an intermediate heating element located at the upper plate;
- a working coil configured to generate a first magnetic field passing through at least one of the object to be heated and the intermediate heating element;
- an inverter configured to control a current applied to the working coil; and
- a magnetic field control module configured to selectively generate a second magnetic field canceling out at least a portion of the first magnetic field,
- wherein an outer diameter of the working coil is a first length,
- wherein an outer diameter of the intermediate heating element is a second length that is greater than the first length,
- wherein an opening of the intermediate heating element through which at least a portion of the first magnetic field passes is located at a center of the intermediate heating element, a diameter of the opening being a third length that is smaller than the first length, and
- wherein an outer diameter of the magnetic field control module is a fourth length that is greater than the first length and smaller than the second length.

2. The cooking appliance of claim 1, wherein the magnetic field control module is located between the intermediate heating element and the working coil.

3. The cooking appliance of claim 1, wherein the magnetic field control module is configured to generate the second magnetic field when the object to be heated is a magnetic substance, and
- wherein the magnetic field control module is configured to not generate the second magnetic field when the object to be heated is a non-magnetic substance.

4. The cooking appliance of claim 1, wherein the magnetic field control module includes a canceling coil configured to selectively generate the second magnetic field based on a type of the object to be heated.

5. The cooking appliance of claim 4, wherein the canceling coil has a pair of spaced apart ends.

6. The cooking appliance of claim 5, wherein the magnetic field control module further includes a switch configured to selectively connect and disconnect the pair of spaced apart ends of the canceling coil.

7. The cooking appliance of claim 6, wherein the switch is configured to turn on to connect the pair of spaced apart ends of the canceling coil when the object to be heated is a magnetic substance, and wherein the switch is configured to turn off to disconnect the pair of spaced apart ends when the object to be heated is a non-magnetic substance.

8. The cooking appliance of claim 4, wherein the canceling coil is located between the intermediate heating element and the working coil.

9. The cooking appliance of claim 4, wherein an outer diameter of the canceling coil is the fourth length.

10. The cooking appliance of claim 4, wherein the canceling coil is configured to generate the second magnetic field when the object to be heated is a magnetic substance, and wherein the canceling coil is configured to not generate the second magnetic field when the object to be heated is a non-magnetic substance.

11. A cooking appliance comprising:

an upper plate configured to support an object to be heated;

an intermediate heating element located at the upper plate;

a working coil configured to generate a first magnetic field passing through at least one of the object to be heated and the intermediate heating element;

an inverter configured to control a current applied to the working coil; and a magnetic field control module configured to selectively generate a second magnetic field canceling out at least a portion of the first magnetic field, wherein an outer diameter of the working coil is a first length, wherein an outer diameter of the intermediate heating element is a second length that is smaller than the first length, and wherein an outer diameter of the magnetic field control module is a third length that is smaller than the second length.

12. The cooking appliance of claim 11, wherein the magnetic field control module is located between the intermediate heating element and the working coil.

13. The cooking appliance of claim 11, wherein the magnetic field control module is configured to generate the second magnetic field when the object to be heated is a magnetic substance, and wherein the magnetic field control module is configured to not generate the second magnetic field when the object to be heated is a non-magnetic substance.

14. The cooking appliance of claim 11, wherein the magnetic field control module includes a canceling coil configured to selectively generate the second magnetic field based on a type of the object to be heated.

15. The cooking appliance of claim 14, wherein the canceling coil has a pair of spaced apart ends.

16. The cooking appliance of claim 15, wherein the magnetic field control module further includes a switch configured to selectively connect and disconnect the pair of spaced apart ends of the canceling coil.

17. The cooking appliance of claim 16, wherein the switch is configured to turn on to connect the pair of spaced apart ends of the canceling coil when the object to be heated is a magnetic substance, and wherein the switch is configured to turn off to disconnect the pair of spaced apart ends when the object to be heated is a non-magnetic substance.

18. The cooking appliance of claim 14, wherein the canceling coil is located between the intermediate heating element and the working coil.

19. The cooking appliance of claim 14, wherein an outer diameter of the canceling coil is the third length.

20. The cooking appliance of claim 14, wherein the canceling coil is configured to generate the second magnetic field when the object to be heated is a magnetic substance, and wherein the canceling coil is configured to not generate the second magnetic field when the object to be heated is a non-magnetic substance.

* * * * *